Figure 1:
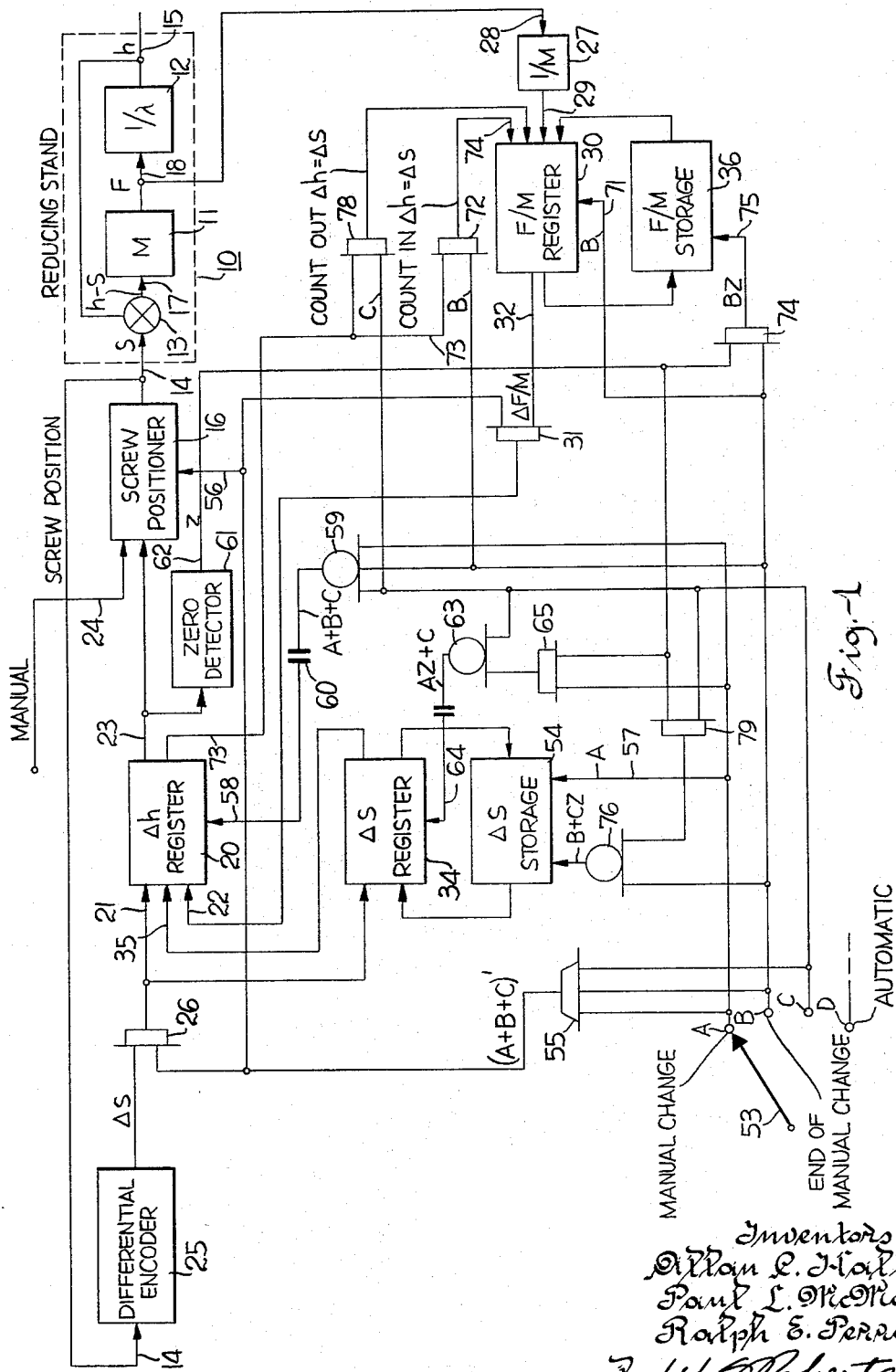

United States Patent Office 3,287,946
Patented Nov. 29, 1966

3,287,946
AUTOMATIC GAUGE CONTROL WITH
MANUAL ADJUSTMENT
Ralph E. Perrault, Monrovia, Calif., Allan C. Halter,
Milwaukee, Wis., and Paul L. McMath, Claremont,
Calif., assignors, by direct and mesne assignments, to
Allis-Chalmers Manufacturing Company, Milwaukee,
Wis.
Filed Dec. 30, 1963, Ser. No. 334,251
10 Claims. (Cl. 72—8)

This invention relates to an automatic gauge control for a hot strip metal rolling mill, more specifically to an automatic gauge control with means to make manual adjustments in the strip thickness that the control is set to maintain.

Some automatic gauge controls are in effect models of the metal rolling mill and the strip in the mill. One well known automatic gauge control is the model of a metal rolling mill as it would be represented by the equation $$h - S = F/M$$

$S$ is the position of the work rolls as the position would be measured from the work roll positioning screws with the reducing stand empty; $h$ is the actual gauge of the material leaving the mill and is also the separation between the work rolls, the difference $h-S$ is the distance the reducing stand housing stretches expressed as the distance the work rolls must be forced apart from initial position $S$ to their actual position $h$; $F$ is the force on the work rolls associated with the distance the housing stretches; $M$ is the mill spring constant that relates the force to this distance, and $F/M$ is the distance expressed in terms of work roll force. The control has stored reference parameters of $S$ and $F/M$ that it compares with the actual values of corresponding mill parameters to solve for changes in strip thickness, $\Delta h = \Delta S + \Delta F/M$, with respect to the desired thickness. In a metal reducing mill with such a control, manual adjustment of the screw position is quite complex because it disrupts the relationship of the stored parameters of the control. One object of this invention is to provide an automatic gauge control with means for manually adjusting the screws to a new position and then operating to maintain the new strip thickness.

Such a manual adjustment would be rather simple if the control could just store the values of $S$ and $F/M$ that exist in the mill at the end of the manual change as its new reference values; this is the operation for generating these parameters when the mill is first shifted to automatic operation after the manual adjustment to obtain the desired gauge. However, it is undesirable to lose the originally stored values and begin with new values. The work roll force and the screw position may change progressively as the strip advances through the mill because the strip cools and thereby hardens; consequently, the reference values selected at one point along the strip length would differ from the reference values selected at any other point. Because the screws are returned to the reference screw position for the next strip, it is desirable to store the reference parameters as near as possible to the leading edge of the strip where the parameters will be most nearly appropriate for the leading edge of the next strip. An object of this invention is to provide a new and improved control that adjusts the stored reference parameters to correspond to a manual change in screw position just as though the manual change had been made close to the leading edge of the strip where the original parameters were stored.

One of the difficulties in achieving this object is that the relationship between work roll force $F$ and strip thickness $h$ is complex so that there is no ascertainable relationship between the original reference value of $F/M$, the amount of the manual change in screw position and the appropriate new reference value of $F/M$.

During a manual change in screw position, the control of this invention inhibits operation of the automatic gauge control to prevent the control from trying to overcome the manual change; it also senses the amount of the manual change. In an automatic gauge control of the type described, the relationship between screw position $S$, strip thickness $h$, and work roll force $F$ remains substantially the same while the screw position is changed (i.e., $M$ is substantially a constant); consequently, a change in screw position at any point along the length of the strip produces the same change in work roll force as that change at any other point if the change brings the strip gauge $h$ back to a reference value. In the control of this invention the strip thickness $h$ at the end of the manual change becomes the new reference thickness and the control operates to maintain changes in mill spring $F/M$ offset by screw position changes $\Delta S$. The reference screw position is made equal to the new screw position minus the screw changes that the automatic gauge control made between the time the original parameters were stored and the time of the manual change. This new reference position differs from the old reference position substantially by the amount of the manual change. In the specific embodiment of the control that will be described later, the automatic gauge control has a $\Delta S$ register that counts $\Delta S$ pulses and stores a value that corresponds to the distance the screws must be operated to return to the reference position. The control of this invention inhibits the $\Delta S$ pulses from entering the $\Delta S$ register during a manual change. Because of the linear relationship between $S$ and $F$ when $h$ is a reference value, the original stored value of $\Delta S$ is appropriate at the new reference gauge.

There is a more complex problem to modify the reference value of $F/M$ since the appropriate new value is not directly related to the amount of the manual change or to the old actual value or reference value of $F/M$. The control of this invention uses the relationship of the stored value of $\Delta S$ to the corresponding value of $$\Delta F/M(\Delta S + \Delta F/M = \Delta h)$$

to generate a new reference value of $F/M$. By updating $F/M$ at the end of the manual change when $\Delta h = O$ the problem is reduced to generating a value of $\Delta F/M$ from the stored value of $\Delta S$. In the control that will be described in detail, the $\Delta S$ value stored in the $\Delta S$ register is transformed into a corresponding value of $\Delta F/M$ and combined with the old stored value of $F/M$ by an interconnection of apparatus of the automatic gauge control.

The detailed description of this invention will discuss and suggest other problems in providing a control and the corresponding advantages and objects of this invention.

In the drawing FIG. 1 is a block diagram of a reducing stand, an automatic gauge control, and the screw position adjusting control of this invention.

Figure 2:
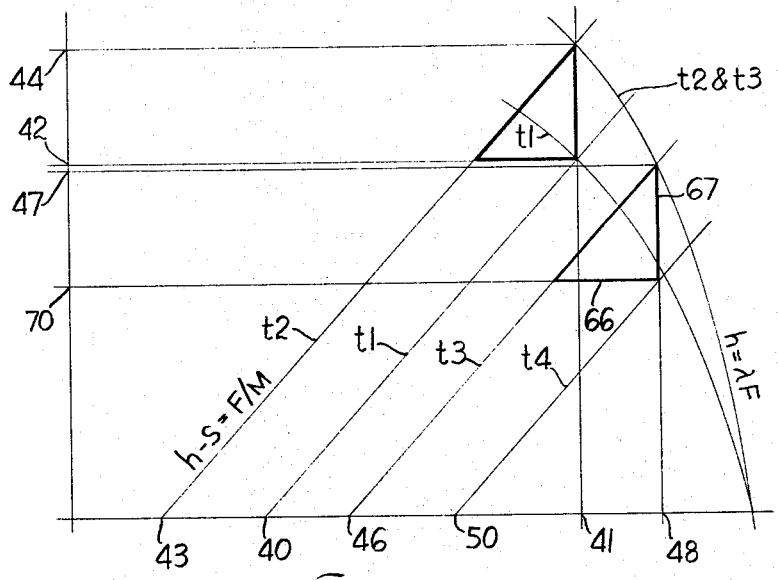

FIG. 2 is a graph showing the relationship between the mill and strip parameters, and the gauge of the material being rolled.

*The reducing stand and the strip*

The single reducing stand 10 of the drawing is represented by two functional boxes 11 and 12 and an adder 13 that show how the reducing stand responds to the screw position 14 to establish the strip thickness 15. Reducing stand 10 is represented functionally because the automatic gauge control that will be described later can be thought of as a model that is based on this representation.

Reducing stand 10 has a screw positioner 16 that drives the work rolls to their initial position S represented by line 14. The screw position is the work roll separation that can be measured at the screws at no load; it is not the actual separation of the work rolls because the work rolls and the housing of reducing stand 10 must spring apart somewhat to establish the force required for rolling the strip to the desired thickness. The actual separation between the work rolls is significant because it equals the strip thickness 15, and the automatic gauge control operates to keep the actual separation constant. As adder 13 and its inputs 14, 15 and its output 17 represent, the strain 17 of the housing equals the strip thickness 15 minus the screw position 14. The strain of the mill housing ($h-S$) and the mill spring constant M establish by Hook's law the force F between the work rolls and the strip. Functional box 11, which represents this relationship in reducing stand 10, multiplies the strain 17 by the mill spring constant M and produces the work roll force $F=M(h-S)$ at its output 18.

The strip thickness depends on the work roll force F of output 18 and on a characteristic λ that includes factors such as the entry thickness and temperature of the strip. Functional box 12, which represents this relationship, receives work roll force F, multiplies it by 1/λ and represents at its output 15 the strip thickness $h$.

As a strip proceeds through the mill, the strip characteristics that are represented by the characteristic λ may change and cause the work roll force F to change; as the diagram of reducing stand 10 illustrates, these changes cause the reducing stand to roll the strip off gauge. An automatic gauge control is provided to adjust screw position 14 to maintain the reference thickness.

The automatic gauge control

FIG. 1 shows a well known automaic gauge control that senses changes in mill strain, F/M, and produces off setting changes in screw position S. A $\Delta h$ register 20 is connected to receive at its input 21 ΔS pulses representing changes in screw position and to receive at its input 22 ΔF/M pulses representing changes in mill strain; at its output 23 it produces a count value corresponding to $\Delta h=\Delta F/M \pm \Delta S$, the error in strip thickness. Screw positioner 16 receives the $\Delta h$ count value 23 and adjusts the screw position 14 in a direction to reduce the count value. Screw positioner 16 also has a manual input 24. The ΔS pulses at input 21 are generated by a differential encoder 25 that is connected by means such as synchronous transmitters to respond to the screw position 14; differential encoder 25 produces a pulse for a predetermined increment of screw position change. (An AND gate 26, described later, connected between differential encoder 25 and $\Delta h$ register 20 is open to transmit ΔS pulses during the automatic operation of the gauge control.) The ΔF/M pulses at input 22 are generated by a device 27 that receives a measure 28 of the mill housing force 18 and produces a signal 29 corresponding to $F/M=h-S$, and by an F/M register 30 that receives signal 29 and produces a pulse for each predetermined increment of force 18. (An AND gate 31 connecting output 32 to input 22, described later, is open during automatic operation of the gauge control.) Signal 28 may be generated by means such as a load cell. F/M register 30 may comprise a pulse source, a counter that is connected through a gate to receive the pulses, a digital to analog converter that produces an analog value corresponding to the count value, and a device that compares the count value with the input 29 and controls the gate to transmit pulses to the counter and to the output 32 only when the input value differs from the counter value.

When the mill operates on a succession of similar strips, the control runs the screws to a predetermined position before a new strip enters the mill. A reference for the predetermined position is stored by a ΔS register 34 when the control first obtains proper gauge; ΔS register 34 that is connected to the output of AND gate 26 to receive ΔS pulses; register 34 is set to zero when the reference thickness is first obtained and it counts the distance that the screw position 14 is changed from the reference. At the end of one strip the stored value is counted into $\Delta h$ register 20 at input 35 (by means not fully shown) to cause the screws to run to the reference position.

A reference value of F/M is also stored to correspond to the reference screw position. An F/M storage register 36 is operable to store the value held in the counter of the F/M register and to set the F/M register to the stored value. In storing the value of F/M register 30, F/M storage register 36 does not change the count value held by register 30.

Operation of the automatic gauge control

FIG. 2 is a graph with curves showing the relationship between F, S and $h$ for four screw positions occurring at successive times that are significant in the explanation of the manual control of this invention, $t$–1, $t$–2, $t$–3 and $t$–4. At each time represented in FIG. 2, one curve shows the relationship $h-S=F/M$ and another curve shows the relationship $h=F/\lambda$. The $h-S=F/M$ curves are substantially linear and can be shifted to the right or left by changing screw position 14. The $h=F/\lambda$ curves are generally nonlinear and change as strip characteristics change.

The curves of time $t$–1 represent the condition when the screw position 14 has the proper value 40 to produce the desired value 41 of strip thickness 15. The work roll force 18 has the value of point 42. At time $t$–1 $\Delta h$ register 20 is given a zero count value so that the control will operate the screw positioner to maintain the strip thickness at point 41; ΔS register 34 is set to zero to provide a reference so that the screws can be returned to position 40 at the beginning of the next strip; and the F/M storage register 36 is operated to store the count value of F/M register 30 (corresponding to point 42) to provide an F/M reference value for the next strip.

The $h=F/\lambda$ curve labeled $t$–2 represents, for example, the effect of gradual cooling of the strip between times $t$–1 and $t$–2. In response to this cooling, the control operates the screws to keep the strip thickness at the value of point 41. Before time $t$–2 (when the manual change begins) the screw position 14 has been adjusted automatically to the value of point 43 and the work roll force has the corresponding value of point 44.

As the curves of $t$–1 and $t$–2 show, the amount of the screw position change (40–43) and the amount of the work roll force change (44–42) form two sides of a right triangle that are related by the slope M of the curve $h-S=F/M$.

The manual control

Suppose that the work roll force value 44 of time $t$–2 is undesirably high and that after time $t$–2 the mill operating personnel operate manual input 24 of screw positioner 16 to change the screw position from point 43 to a point 46 at time $t$–3. With this change the work roll force is reduced from the value of point 44 to the value of point 47; this operation also causes mill 10 to roll the strip thicker as point 48 represents, but other reducing stands in the mill will automatically operate to accept the load that was taken off stand 10. The general object of the control of this invention is to allow the operating personnel to make the change associated with the increase in thickness from point 41 to point 48 and to generate and store reference parameters that will operate the control with the screws at the position of point 50 at the beginning of the next strip. Point 50 is displaced from the original reference position 40 by the amount of the manual change (43 to 46).

AND gates 26 and 31 of the manual control have been mentioned already. The other components of the manual control will be described in three separate groups; one group that operates during the manual change and two groups that operate in succession after the manual change but before the mill is returned to the automatic gauge control. In the drawing, means shown schematically as a manually operated four position switch 53 operates the control through these three stages by energizing terminals designated A, B and C, and operates to return the control to automatic as a fourth terminal designated D represents. Means 53 is associated with manual input 24 of screw positioner 16 to have its A terminal energized during the manual change and to have its B terminal energized at the end of the manual change; the transition to stages C and D may be made by timers started by terminal B.

During the manual change, $\Delta S$ register 34 is controlled to keep its value of automatic screw position change from point 40 to point 43 since this is the difference between point 46, the position at the end of the manual change, and point 50 where the control should return the screws for the next strip. Because $\Delta h$ register 20 is used in generating the parameters for the curve of $t$–4, $\Delta S$ and $\Delta F/M$ pulses are inhibited from entering $\Delta h$ register 20, the $\Delta h$ register is set to zero at its output 23, and screw positioner 16 is operated to not respond to the $\Delta h$ register. Since the value held in $\Delta S$ register 34 is counted out in the process of generating the new reference parameters, a storage register 54 is provided for storing this value and then returning it to $\Delta S$ register 34.

When the A terminal of device 53 is energized, AND gates 26 and 31 are controlled to inhibit $\Delta S$ and $\Delta F/M$ pulses from entering $\Delta h$ register 20 and screw positioner 16 is controlled by an input 56 to not respond to the count value of output 23, as NOR gate 55 represents. The $\Delta S$ storage register 54 is operated by a signal 57 to store the existing count value of $\Delta S$ register 34. The $\Delta h$ register 20 is controlled by a signal 58 to have a zero count value at output 23. Signal 58 may be generated by an OR gate 59 that has inputs connected to terminals A, B and C of device 53; it resets $\Delta h$ register 20 to zero only once during each stage of the operation as a capacitor 60 represents schematically and thereafter allows the $\Delta h$ register to count pulses at its input 35. The means for resetting $\Delta h$ register 20 to zero may comprise a pulse source and a zero detector that operate in response to signal 58 until the count value is zero. Completion of the count of $\Delta h$ register 20 to zero is a convenient halfway point in each of the three stages represented by terminals A, B and C, and a zero detector 61 is connected to receive the count value at output 23 and to energize its output 62 whenever the count value is zero (as a Z at the output represents). When $\Delta h$ register 20 has been counted to zero, $\Delta S$ register 34 is operated to transfer its count to the $\Delta h$ register as a series of pulses at input 35. As the drawing illustrates the invention, an OR gate 63 is connected to energize an input 64 of $\Delta S$ register 34 to count it into $\Delta h$ register 20; one of the inputs of OR gate 63 is connected to be energized by the output of an AND gate 65 after the $\Delta h$ register is first counted to zero, as inputs A and Z of AND gate 65 represent. Thus, at the end of the manual change, $\Delta h$ register 20 has a count value 23 corresponding to the difference between points 40 and 43 or 46 and 50 in FIG. 2 and $F/M$ register 36 has a count value corresponding to point 47 in FIG. 2.

As FIG. 2 shows, the reference value of $\Delta S$ is the difference between points 46 and 50, the value that is stored in $\Delta S$ register 34. This value is drawn in FIG. 2 as one side 66 of a triangle relating S and F; the other side 67 of the triangle is the difference between the count value in $F/M$ register 30 at the end of the manual change and the value that $F/M$ storage register 36 should hold over to the next strip. The value actually held in $F/M$ storage register 36 at this time has no significant relationship to any condition of the mill or the control because the curves $h = F/\lambda$ cannot be described effectively. Although the sides 66 and 67 are dimensionally unequal, the corresponding values of $\Delta S$ and $\Delta F/M$ are equal; that is, the count value of $\Delta h$ register 20 is $\Delta h = \Delta S = \Delta F/M$.

At the end of the manual change when terminal A is deenergized and terminal B is energized, the control is operated to store the existing value of work roll force (point 47) in the $F/M$ counter, to modify this by the count value of the $\Delta h$ register to give th $F/M$ register a value corresponding to point 70 in FIG. 2, and to store this new value in $F/M$ storage register 36.

As the drawing illustrates the invention, an input 71 of $F/M$ register 30 is energized to cause register 30 to stop counting any incremental changes at its input 29. The B input of OR gate 59 is energized to cause $\Delta h$ register 20 to be counted to zero, and means represented as an AND gate 72 is operated to transmit the $\Delta h$ pulses at output 73 of $\Delta h$ register 20 to an input 74 of $F/M$ register 30 where these pulses cause register 30 to count from a value corresponding to point 47 to a value corresponding to point 70. At the end of this count, output 62 of zero detector 61 is energized, and it opens an AND gate 74 that energizes an input 75 to operate storage register 36 to store the value of $F/M$ register 30.

After $\Delta S$ register 34 is counted into $\Delta h$ register 20, storage register 54 is operated to restore the count value to the $\Delta S$ register. As FIG. 1 shows, an OR gate 76 is connected to energize an input of storage register 54 to operate it to give $\Delta S$ register 34 the stored value. One input of OR gate 76 is connected to be energized at terminal B of device 53.

When the C terminal of device 53 is energized, $\Delta S$ register 34 is operated to count into the $\Delta h$ register and the $\Delta h$ register is operated to count to zero and is connected by means represented by an AND gate 78 to count out of $F/M$ register 30 the value $\Delta F/M = \Delta S$. This operation returns $F/M$ register 30 to the appropriate value represented by point 47 in FIG. 2 and it gives $\Delta h$ register a count value of zero which corresponds to the fact that the strip thickness of point 48 is the new reference. The appropriate count value is returned to $\Delta S$ register 34 by energizing an input of OR gate 76 by means represented in FIG. 1 as an AND gate 79 having its two inputs connected to be energized by terminal C and by the output 62 of zero detector 61.

Thus, the control is ready to operate with the new parameters when the device 53 returns it to automatic operation represented by terminal D. At the end of the strip in stand 10, input 64 of $\Delta S$ register 34 is energized (manually or by means not fully shown) to count into $\Delta h$ register 20 the count value held by the $\Delta S$ register. This count value appears at output 23 of the $\Delta h$ register, and screw positioner 16 operates in response to this signal to run the screws to the position represented by point 50. The stored value in $F/M$ storage register 36, which corresponds to point 70 in FIG. 2, is transferred to the counter of $F/M$ register 30. When the next strip enters the stand 10, $F/M$ register 30 receives a $F/M$ signal 29, compares it with the stored value and produces a signal at output 32 indicating errors in strip thickness from the reference thickness of point 48.

The specific logic circuits of FIG. 1 will suggest variations that can be made by well known design techniques. One of the specific objects of the invention has been to use many of the existing components of the automatic gauge control; if desired separate components may be used and the logic circuitry will to some extent be simplified. In the control of FIG. 1 the operation is advanced from one stage to the next partly in response to the sequence established by switch 53 and partly in response to signal 62 developed in the control; if desired the sequence can be advanced entirely or to a selected extent by internal signals or switch 53 signals. An automatic gauge control similar to the control of FIG. 1 keeps the screw position 14 constant ($\Delta S = 0$) and varies work roll speed in response to changes in $F/M$; the manual control that has been described in detail can be adapted to generate and store appropriate references for speed or tension and for work roll force when a speed change is manually introduced in such a system. The description of the manual control for a specific automatic gauge control should suggest application to other types of mill controls, and the description of a metal rolling mill will suggest application of the invention to other apparatus where reference parameters are to be varied. Those skilled in the art will recognize various changes within the spirit of the invention and scope of the claims.

Having now particularly described and ascertained the nature of our said invention and the manner in which it is to be performed, we declare that what we claim is:

1. In a control for a system having means comparing a system first parameter with a reference and ordering changes in a system second parameter according to a relationship between changes in said first and second parameters to maintain a predetermined system condition,
   manually controlled means for changing said system second parameter independently of the control action of said comparing means to achieve a second system condition, and
   means responsive to the change in said system second parameter by said manually controlled means and including a register for said system second parameter to change said reference according to said relationship to a value corresponding to the quantity recorded in said register at the beginning of said change by said manually controlled means and the existing value of said system first parameter at the end of said change by said manually controlled means.

2. In a control for a system that operates to establish a subject parameter value according to the value of a first and a second system parameter, said first and second parameters and said subject parameter having a defined relationship, said second parameter and said subject parameter having a variable relationship,
   means defining reference values of said first and second parameters corresponding to a selected value of said subject parameter,
   means for adjusting said system first parameter in response to variations in said system second parameter to maintain said subject parameter at said selected value,
   means to change said system first parameter to produce a new subject parameter value,
   means to change said first parameter reference according to a change in said system first parameter which produces a new selected subject parameter value, and
   means responsive to said change to said first parameter reference to correspondingly change said second parameter reference.

3. A control for a system that can be described by a set of equations comprising a linear equation and a nonlinear equation, said linear equation containing a first and a second parameter and a controlled parameter, said nonlinear equation containing said second parameter and said controlled parameter, comprising,
   means for storing a reference of said first parameter and a reference of said second parameter, said stored references defining a desired value of said controlled parameter,
   means operable in response to the value of said controlled parameter to vary said system first parameter to maintain said desired value,
   means for varying said system first parameter to obtain a new value of said controlled parameter,
   means operable on said stored first parameter reference to produce a new stored reference modified according to the difference between said desired value and said new value of said controlled parameter, and
   means responsive to the change to said first parameter reference and to the linear relationship between said first and second parameter and said controlled parameter to change said second parameter reference to correspond to said new value of said controlled parameter.

4. In a control for a metal rolling mill having means comparing a screw position mill parameter with a reference value of said parameter and operating on said mill parameter to maintain a uniform selected value of a rolled subject parameter,
   means for changing said mill parameter independently of said comparing means whereby said subject parameter is changed from a first selected value to a second selected value, and
   means responsive to said change in said mill parameter from said first to said second selected value to change said stored reference value by a corresponding amount and including means for inhibiting operation of said comparing means during said change in mill parameter.

5. In a control for reducing stand for a metal rolling mill,
   means providing stored reference values of work roll force and a second parameter,
   means sensing changes in mill work roll force with respect to said stored reference and ordering changes in said second mill parameter to maintain a first relationship between mill force and said second mill parameter defining a first subject thickness,
   manually operable means for changing said second mill parameter whereby the rolled subject is rolled to a second thickness value,
   means responsive to a manual change in said mill second parameter to correspondingly change said stored reference of said second parameter, and
   means responsive to the manual change in said second mill parameter to change said mill force stored reference value according to said change and according to said relationship between work roll force changes and changes in said second parameter when changes in subject thickness are between selected reference values.

6. A control for a metal rolling mill having means to adjust the screw position in response to variations in work roll force according to the relationship between changes in work roll force and changes in screw position when the subject thickness is kept at values of zero error, comprising,
   means responsive to changes in screw position to define a screw position reference,
   means for varying the screw position to change subject thickness from a first zero error thickness to a second zero error thickness,
   means operable on said means defining a screw position reference to produce a new screw position reference modified according to the change in screw position associated with the change from said first thickness to said second thickness,
   means responsive to the modification to the screw position reference and to the relationship between screw position changes and work roll force changes to produce a corresponding reference of work roll force.

7. In an automatic gauge control of the type having a first register producing an output indicating changes in work roll force, a first storage register for storing a reference value of work force, means providing a digital output indicating changes in screw position, a second register receiving said screw position output and producing a count value corresponding to the difference between a reference screw position and the actual screw position, and a third register responsive to the difference between the work roll force change output and the screw position change output to vary the screw position to maintain said changes equal,
   means to produce a screw position change independent of the controlling action of said third register to change the thickness of a rolled subject,
   means operable during said independent change to prevent screw position change information from entering said screw position register whereby at the end of an independent change the reference defined by said register corresponds to its original reference modified by the amount of the independent change, and means for giving said first storage register a count value at the end of an independent change corresponding to the count value of said second register and the existing value of work roll force.

8. A control according to claim 7 including means operable at the end of an independent screw position change to give said third register a zero error indicating output.

9. A control according to claim 8 including, means operable at the end of said independent change to cause said first register to hold the existing mill value of work roll force, means operable at the end of an independent change to transfer the count value of said second register to said first register whereby said first register has a count value corresponding to zero error when the screws are set to the reference position defined by said second register, means operable after said transfer to said first register to store the count value in said first register in said first storage register, and means operable after said count value is stored in said first storage register to restore said first register to its previous count value.

10. A control according to claim 9 in which said means to transfer the count value of said second register to said first register comprises, means operable at the end of said independent change to set said third register to have a zero output, and means operable after said third register reaches a zero output to transfer the count value of said second register to said third register and from said third register to said first register.

References Cited by the Examiner

UNITED STATES PATENTS

| | | | |
|---|---|---|---|
| 2,972,268 | 2/1961 | Wallace et al. | 72—8 |
| 3,096,670 | 7/1963 | Stringer | 72—8 |
| 3,186,201 | 6/1965 | Ludbrook et al. | 72—9 |

CHARLES W. LANHAM, *Primary Examiner.*

L. A. LARSON, *Assistant Examiner.*

UNITED STATES PATENT OFFICE
CERTIFICATE OF CORRECTION

Patent No. 3,287,946                                            November 29, 1966

Ralph E. Perrault et al.

It is hereby certified that error appears in the above numbered patent requiring correction and that the said Letters Patent should read as corrected below.

Column 8, line 19, after "for" insert -- a --; line 19, for "for" read -- of --; column 9, line 4, after "said" insert -- second --.

Signed and sealed this 12th day of September 1967.

(SEAL)
Attest:

ERNEST W. SWIDER                                    EDWARD J. BRENNER
Attesting Officer                                         Commissioner of Patents